J. H. SCHLAFLY.
CONNECTION FOR CULVERT SECTIONS.
APPLICATION FILED APR. 1, 1908.

898,510.

Patented Sept. 15, 1908.

Witnesses
Harry O. Rastetter
Sylvia Boron

Inventor
Julius H. Schlafly
By Bond & Miller
Attorneys

THE NORRIS PETERS CO., WASHINGTON, D. C.

UNITED STATES PATENT OFFICE.

JULIUS H. SCHLAFLY, OF CANTON, OHIO, ASSIGNOR TO EDWARD A. LANGENBACH, OF CANTON, OHIO.

CONNECTION FOR CULVERT-SECTIONS.

No. 898,510.  Specification of Letters Patent.  Patented Sept. 15, 1908.

Application filed April 1, 1908. Serial No. 424,526.

*To all whom it may concern:*

Be it known that I, JULIUS H. SCHLAFLY, a citizen of the United States, residing at Canton, in the county of Stark and State of Ohio, have invented certain new and useful Improvements in Connections for Culvert-Sections; and I do hereby declare that the following is a full, clear, and exact description of the same, reference being had to the accompanying drawing, making a part of this specification, and to the numerals and figures of reference marked thereon, in which—

Figure 1:
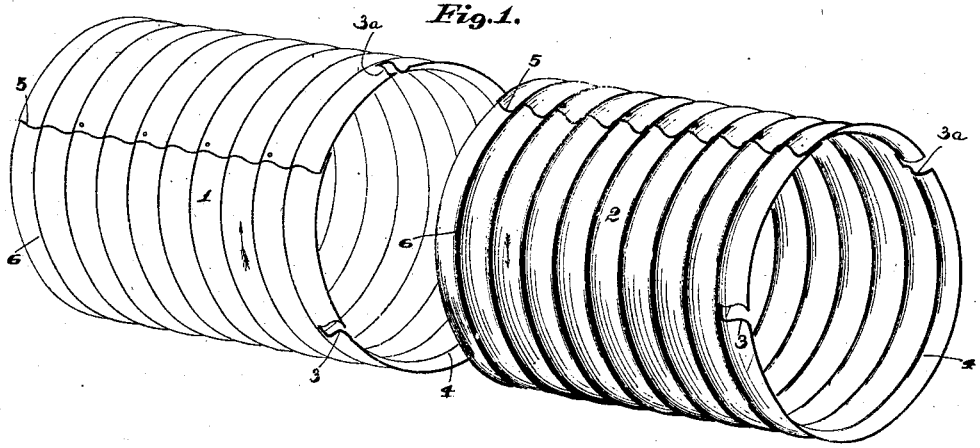
Figure 2:
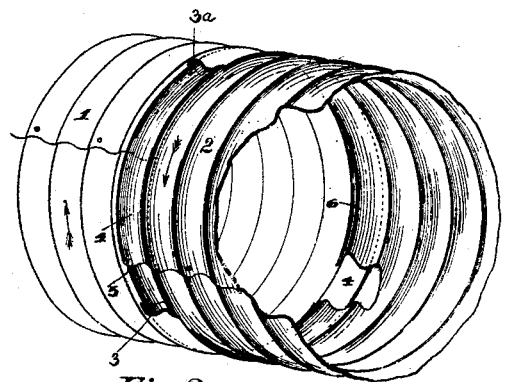
Figure 3:
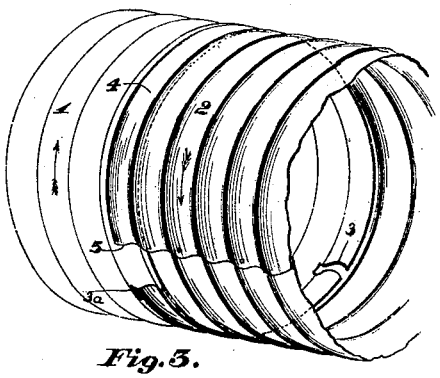
Figure 4:
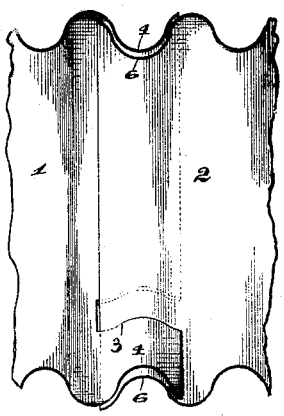
Figure 5:
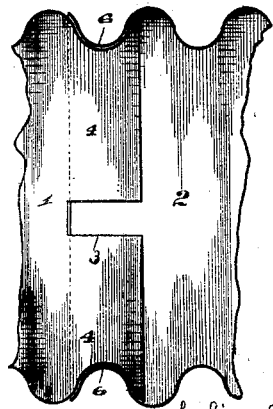

Figure 1 is a view showing two culvert sections detached from each other, showing the ends designed to be connected, located in proper relationship with reference to each other. Fig. 2 is a perspective view showing the culvert sections in the same relative position as shown in Fig. 1, except that the sections are pushed together. Fig. 3 is a perspective view showing the same parts shown in Fig. 1, partially turned with reference to each other to complete the connection of two culvert sections. Fig. 4, is a horizontal longitudinal section showing two culvert sections in the same relative position that they are shown in Fig. 2. Fig. 5 is a longitudinal section showing portions of two culvert sections in their relative positions when finally connected together.

The present invention has relation to connection for culvert sections, and it consists in the novel arrangement hereinafter described and particularly pointed out in the claims.

Similar numerals of reference indicate corresponding parts in each figure of the drawing.

In the accompanying drawing 1 and 2 represent two culvert sections designed to be connected together, but it will be understood that any desired number of sections may be connected together in the same manner that the two sections here illustrated are connected together, reference being had to the length of the culvert desired. The sections 1 and 2 are formed substantially alike, but are given different numbers for the purpose of making it more clear as to the manner of connecting the sections 1 and 2 together. Each section is provided at one of its ends with the notches or recesses 3 and 3ª, which notches or recesses are of a depth equal to or substantially equal to the end corrugations 4 and 6. The opposite ends of the sections are formed without notches, and the lapped seams or joints 5 left free, or without connecting rivets or bolts for a distance equal to the width of the first or second end corrugation. This matter being a question of judgment, but to carry out the purpose the lapped surfaces of the seam proper must be unriveted at the end corrugation for the purpose hereinafter described.

In use the sections 1 and 2 are shoved together or telescoped for a distance equal to or substantially equal to the width of the end corrugations. In practice it is found to be most practical to bring the two sections at a slight angle to each other and seating the end corrugation 6 upon its under side against the upper surface of the end corrugation 4 after which the culvert sections are brought into alinement with reference to each other and when in this position the corrugation 6 is inside of the corrugation 4, but the two culvert sections will not be held against endwise movement with reference to each other, or in other words the culvert sections 1 and 2 are not permanently connected together, but are temporarily held together by reason of the convexed surface of the corrugation 6 resting or being seated in the concaved surface of the corrugation 4.

In the drawing I have illustrated the entire length of the culvert sections provided with a series of corrugations, but I do not desire to be limited to this construction as the object and purpose of the present invention can be carried out without any reference to the culvert sections being corrugated, except as to the lapped portions of the culvert sections and I do not desire to be limited as to the end corrugations as the culvert sections may be connected together as hereinafter described, even though the connected ends are not provided with corrugations, but to permanently connect the culvert sections together so as to prevent any possible accidental displacement the connected ends should be corrugated to produce a better and more permanent joint.

In use after the culvert sections have been connected together so as to bring the corrugations or part 6 within the corrugation or part 4, the sections are rotated relatively with reference to each other and when so rotated the upper lapped portion 5 of the unclosed seam proper will ride over the outer surface of the convolution 4 when it reaches the notch or recess 3 and by a continuous rotation for a sufficient distance the inner convolution 6 will be located upon the just before outer convolution 4, or in other words by the changing or transposition of the relative positions the two culvert sections are securely connected together and cannot be disconnected from each other without a bending or springing or flattening of the convolutions.

Having fully described my invention what I claim as new and desire to secure by Letters Patent, is—

1. In a connection for culvert sections, culvert sections provided with notched and unnotched ends respectively, the unnotched ends provided with an unclosed lapped joint, said culvert sections being telescopically and rotatably connected together, whereby the telescopic sections are transposed, substantially as and for the purpose specified.

2. In a device of the character described, culvert sections telescopically connected together and rotated relatively with reference to each other whereby the portions of the lapped telescopic sections are transposed, substantially as and for the purpose specified.

3. In a device of the character described, culvert sections adapted to be lapped one within the other at their adjacent ends, notches formed in the end of one of the sections and an open lapped joint formed in the end of the other section, and means whereby the lapped portions may be transposed, substantially as and for the purpose specified.

4. In a device of the character described, culvert sections adapted to be lapped one within the other at their adjacent ends, notches formed in the end of one of the sections and an open lapped joint formed in the end of the other section, and means whereby the lapped portions may be transposed as to their entire contact surfaces, substantially as and for the purpose specified.

5. In a device of the character described, culvert sections adapted to be lapped one within the other at their adjacent ends, notches formed in the end of one of the sections and an open lapped joint formed in the end of the other section and means whereby the parts may be transposed for part of their contact surfaces, substantially as and for the purpose specified.

In testimony that I claim the above, I have hereunto subscribed my name in the presence of two witnesses.

JULIUS H. SCHLAFLY.

Witnesses:
   GEO. J. SMITH,
   J. SOHNE.